June 1, 1965 J. A. CHURCHILL 3,186,718

SOUND REPRODUCING MACHINES

Filed June 23, 1960 5 Sheets-Sheet 1

INVENTOR
JOHN ADRIAN CHURCHILL
BY Maxwell E. Sparrow
ATTORNEY

JOHN ADRIAN CHURCHILL INVENTOR

BY [signature]

ATTORNEY

June 1, 1965 J. A. CHURCHILL 3,186,718

SOUND REPRODUCING MACHINES

Filed June 23, 1960 5 Sheets-Sheet 3

INVENTOR
JOHN ADRIAN CHURCHILL
BY [signature]
ATTORNEY

June 1, 1965 J. A. CHURCHILL 3,186,718

SOUND REPRODUCING MACHINES

Filed June 23, 1960 5 Sheets-Sheet 4

INVENTOR
JOHN ADRIAN CHURCHILL
BY [signature]
ATTORNEY

June 1, 1965 J. A. CHURCHILL 3,186,718

SOUND REPRODUCING MACHINES

Filed June 23, 1960 5 Sheets-Sheet 5

INVENTOR
JOHN ADRIAN CHURCHILL
BY [signature]
ATTORNEY

United States Patent Office 3,186,718 Patented June 1, 1965

3,186,718
SOUND REPRODUCING MACHINES
John Adrian Churchill, Thorpe-le-Soken, England, assignor to Foster-Mallard Limited, London, England
Filed June 23, 1960, Ser. No. 38,148
Claims priority, application Great Britain, June 25, 1959, 21,884/59
4 Claims. (Cl. 274—10)

This invention relates to sound reproducing machines of the kind in which grooved disc-shaped records are used in association with a pick-up device, means being provided for supporting a plurality of records in an upper position concentrically above the turntable and rotating them so that the recording on the underside of each record may be played before that record is dropped on to the turntable, using an upwardly projecting stylus on the pick-up, the recording on the upper side of each record being played after the record has dropped by a second stylus projecting downwardly from the pick-up.

It is the main purpose of the present invention to provide improved control mechanism for the machine whereby the different settings of the machine for playing undersides and top sides of records are reliably effected in a relatively simple manner.

A subsidiary purpose of the invention is to provide a control mechanism which can readily be rendered temporarily ineffective so as to allow automatic playing of only one side of each of a number of records, or playing of only one record side with manual setting of the pick-up for starting.

In a sound reproducing machine of the kind referred to the initiation of a control cycle and the horizontal outward movement of the pick-up arm after the playing of a record is finished are effected similarly whether the last playing was of the underside or of the top side of a record. Assuming that the stacked records awaiting playing are arranged to rotate as one with the turntable, the operations for which different settings are required depending on whether the underside or the top side of a record is to be played are:

(1) The direction of rotation of the turntable and record stack;

(2) The vertical movements of the pick-up for bringing a stylus out of engagement with a record above it and bringing another stylus into engagement with a record below it or vice versa; and (3) The releasing of the records to fall on to the turntable, which must normally take place only during a control cycle preceding the playing of the top side of a record.

According to the present invention, in a sound reproducing machine of the kind referred to, mechanisms controlling the direction of rotation of the turntable and record stack, the movements of the pick-up transverse to its direction of swing across the record surfaces, to bring it into playing relation with a record surface above or below it, and the releasing of records to fall from the stack on to the turntable are all set to appropriate positions for playing the top side or the under side of a record by a rocking member which is movable between two predetermined positions and, during each control cycle of the machine, is moved from one of said positions to the other.

The rocking member may be moved from one position to another by a pecker member which has movement transmitted to it during each control cycle, the rocking member being so shaped that, when it is in either one of its predetermined positions, the movement of the pecker member moves it to its other predetermined position.

The pecker member may be mounted on a pivoted arm moved by a striker during each control cycle.

The striker may be embodied in a control member arranged to perform a single revolution during each control cycle, the said control member including a cam acting on an arm to effect outward and inward movement of the pick-up arm.

The rocking member may be formed with two notches separated by a V-shaped nose the centre line of which passes through the pivot of said rocking member, the path of movement of the pecker member being such that it passes to one side of the nose when the rocking member is in one position and to the other side of the nose when the rocking member is in the other position.

The invention is hereinafter described with reference to the accompanying drawings, in which.

Figures 1, 2:
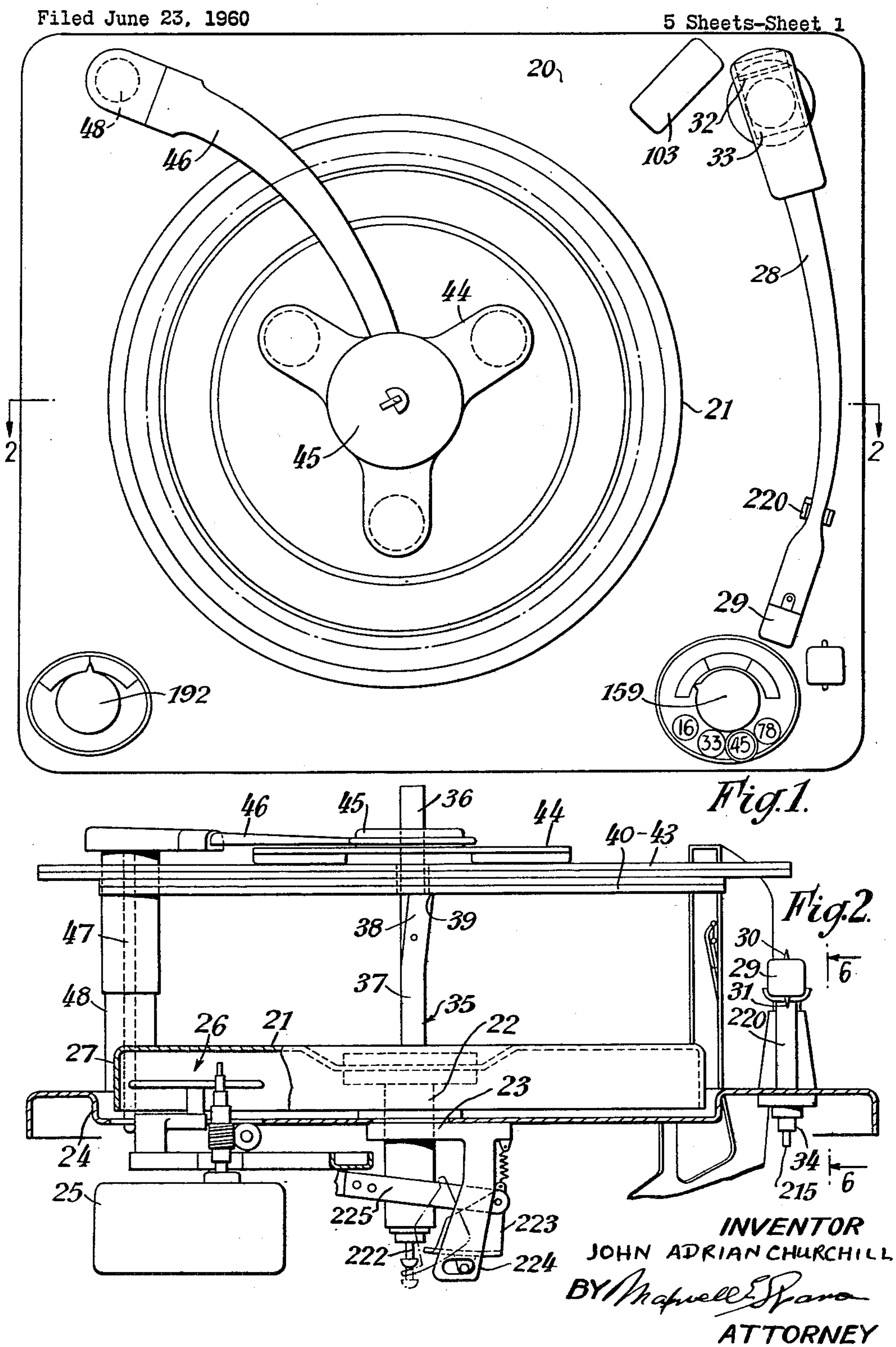
FIGURE 1 is a plan view of a sound reproducing machine embodying the invention.
FIGURE 2 is a sectional elevation on the line 2—2 of FIGURE 1.

Referring to FIGURES 1 and 2 of the drawings the working parts of the sound reproducing machine are mounted on a base-plate 20 which may be mounted in any suitable cabinet, preferable on resilient supports (not shown).

A turntable 21 is mounted on a tubular spindle 2 supported in a bearing 23 at the centre of a depression 24 in the base-plate 20, and is driven by an electric motor 25 supported on the underside of the base-plate 20, through a transmission mechanism 26, more fully described hereinafter, providing a frictional drive to a dependent rim 27 on the turntable.

Figures 6, 7:
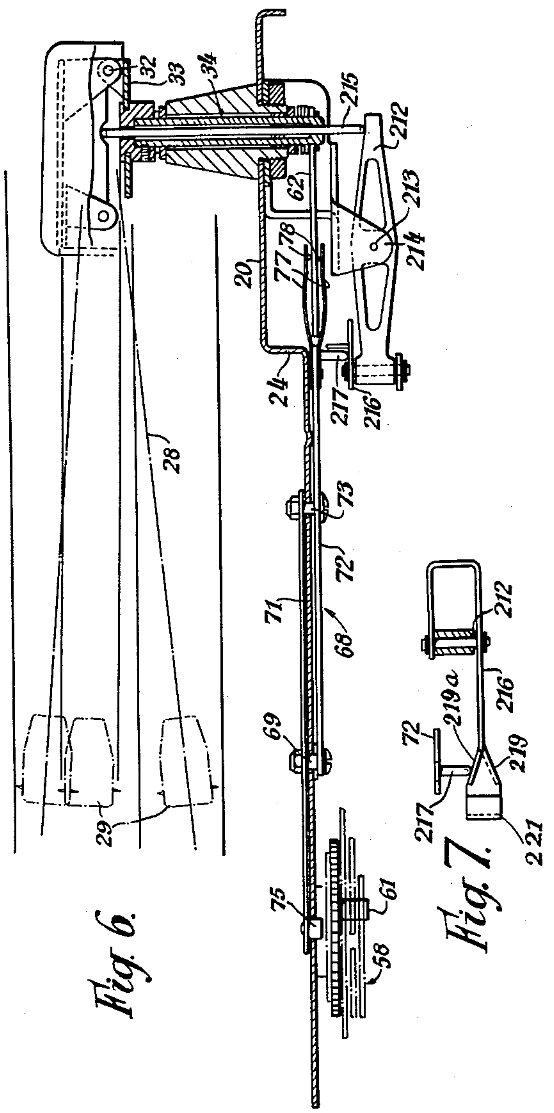
FIGURE 6 is a sectional elevation on line 6—6, FIGURE 2.
FIGURE 7 is a detail elevation of part of FIGURE 6.

A pick-up arm 28, carrying a pick-up 29 provided with two stylii 30 and 31 respectively projecting in downward and upward directions is mounted (as shown in FIGURE 6) to swing in a vertical plane about a pivot pin 32 carried by a bracket 33 fixed to a vertical tubular spindle 34 mounted in a bearing member fixed to the base-plate, the spindle 34 extending downwardly through the base-plate.

A removable spindle 35, frictionally engaged in the bore of the tubular spindle 22 so as to rotate with the turntable, extends upwardly from the said turntable, the spindle having concentric upper and lower portions 36 and 37 and an oblique intermediate portion 38 the upper end of which forms a shoulder 39 to support a stack of records above the turntable, mechanism being provided to move the records one-by-one off the shoulder and allow them to fall on to the turntable. Records on the spindle are indicated by the reference numerals 40, 41, 42 and 43, and are held in a horizontal position, and caused to rotate with the turntable 21, by an upper turntable 44 keyed to the spindle and rotatable in a bearing 45 carried by an arm 46 supported on a spindle 47 slidable in a guide pillar 48 standing up from the base-plate 20.

Figure 3:
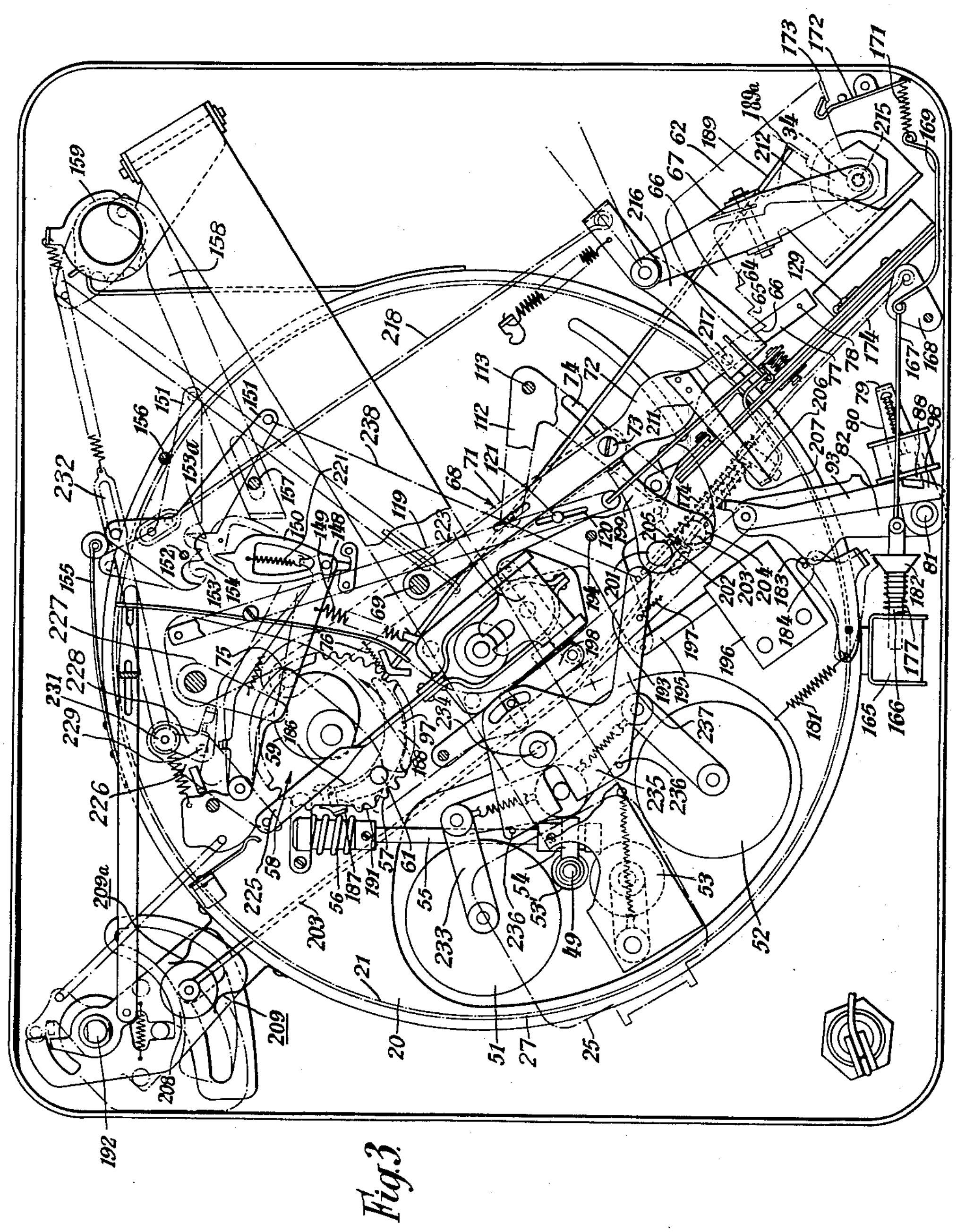
FIGURE 3 is an inverted plan view, on a larger scale, showing the parts in the positions they occupy when the machine is not working.
Figure 4:
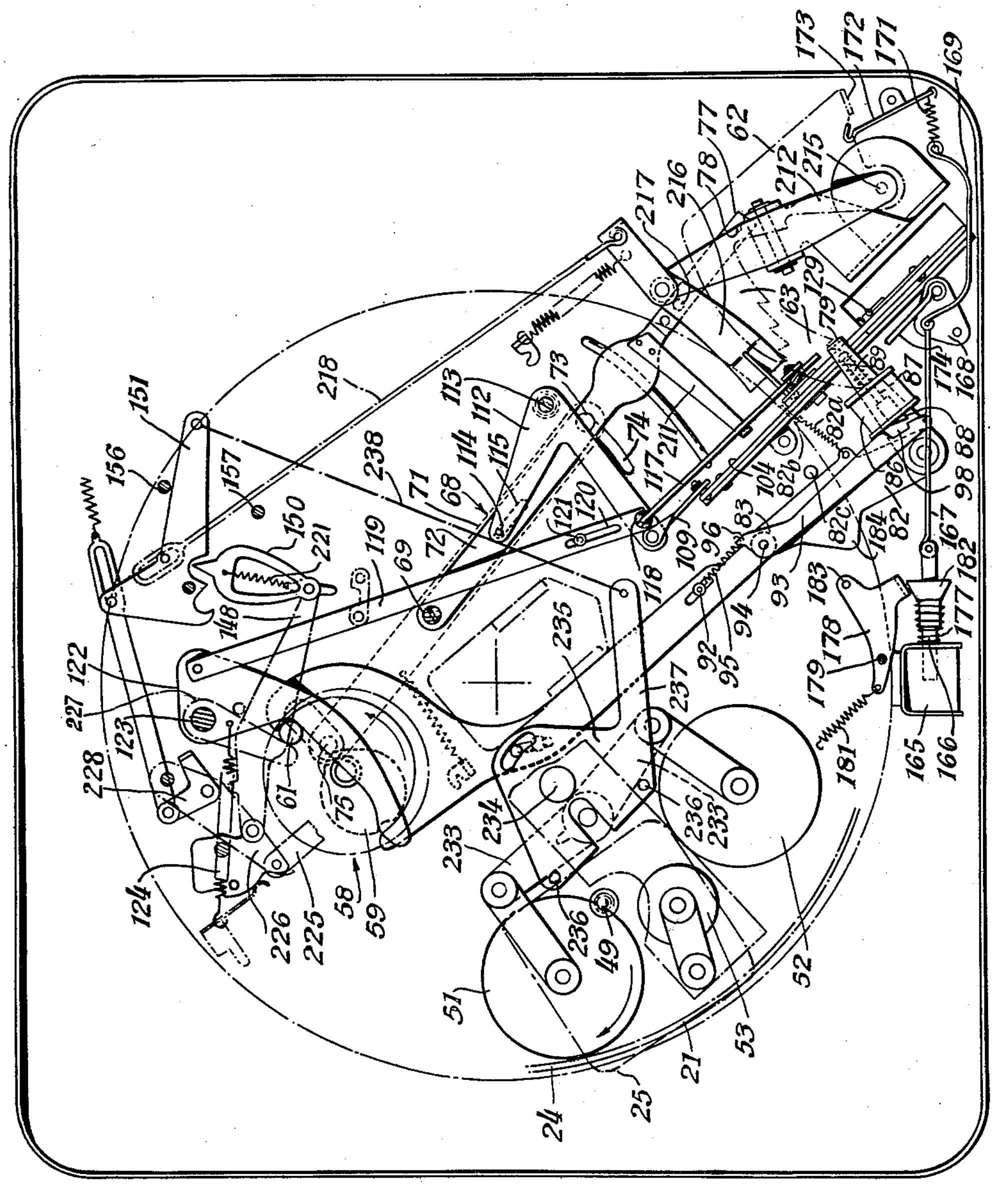
FIGURE 4 is a view similar to FIGURE 3 showing the parts in the position they occupy at the instant when the rocking member has just been moved from the position shown in FIGURE 3.
Figure 5:
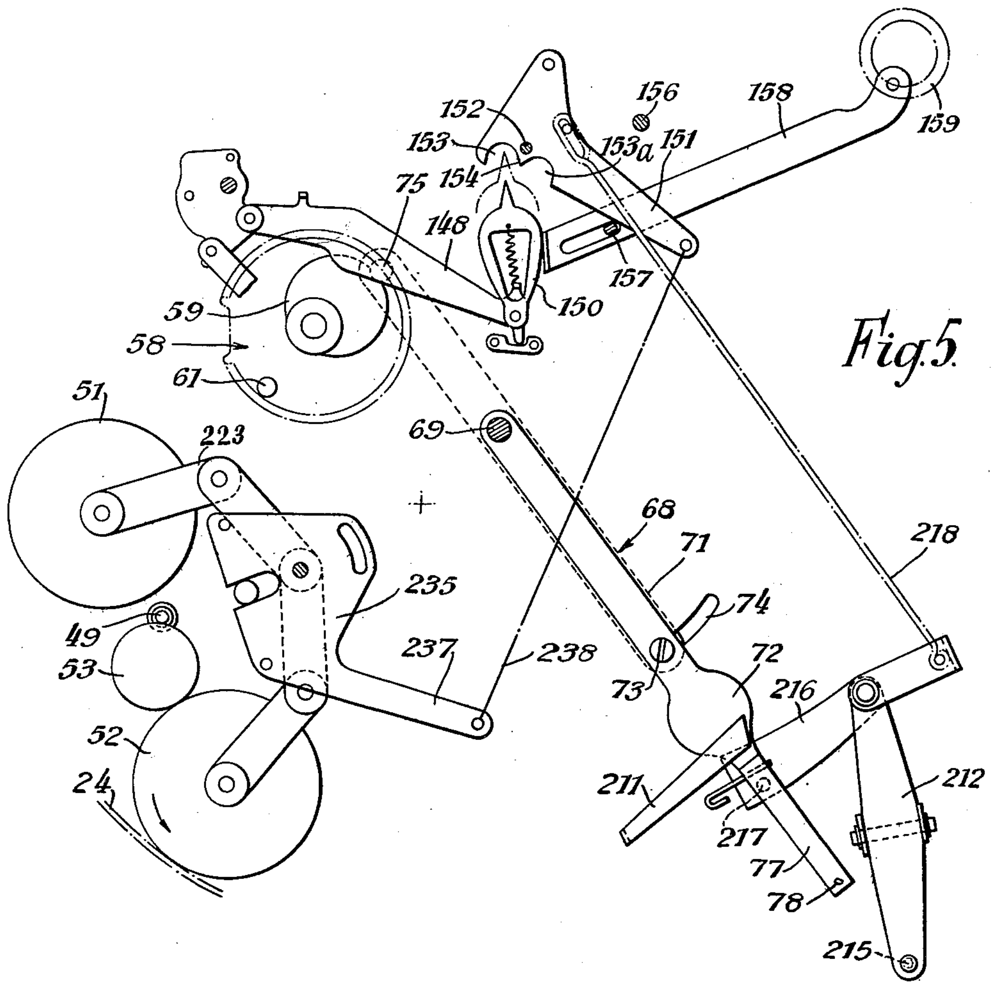
FIGURE 5 is another view similar to FIGURE 3 showing the parts set for playing only the upper sides of records.

Referring now to FIGURES 3 and 4 of the drawings, the electric motor 25 has mounted on its spindle a stepped driving wheel 49 adapted to drive the turntable through one or other of two friction wheels 51 and 52, an idler wheel 53 being interposed between the driving wheel 49 and the friction wheel 52 so that the turntable is driven in opposite directions by bringing the friction wheel 51 or the friction wheel 52 into an operative position, and the speed of the turntable is determined by moving the friction wheels vertically to bring them into the plane of the appropriate portion of the driving wheel 49. The spindle of the electric motor also carries a worm 53′ meshing with a worm wheel 54 mounted on a shaft 55 journalled in bearings on the underside of the base-plate 20, the shaft 55 also having mounted on it a worm 56 for driving an interrupted gear 57 forming part of a rotary control unit 58 brought into operation when the machine is started, and at the termination of the playing of each recording, to reset the machine for playing the next recording, or to stop its operation when there are no more records to be played.

The rotary control unit 58 includes a cam 59 and a pin 61, eccentric to the axis of the said control unit, the pin 61 acting on various arms as hereinafter described.

The tubular spindle 34 carries, below the base-plate 20, a plate 62 including an arcuate arm 63 concentric with the spindle 34 and having one end thereof shaped to provide three steps 64, 65, 66. The plate 62 is formed on opposite sides with two grooves, one of which is shown at 67, these grooves being co-extensive and extending radially with respect to the spindle 34.

A compound arm 68, pivoted at 69 on the base-plate and having one of its portions 71 above the base-plate and the other portion 72 below the base-plate has both of its portions attached to the pivot pin at 69, the two portions being also connected one to the other by a pin 73 passing through an arcuate slot 74 in the base-plate. The portion 71 of the arm 68 carries a roller cam follower 75 co-operating with the cam 59, against the profile of which it is urged by a spring 76, the portion 72 of the arm 68 carrying two spring fingers 77 formed with pips 78 adapted to engage in the grooves 67 in the plate 62. The arm 68 normally occupies the position in which it is shown in FIGURE 3, the cam follower being in engagement with the cam at the highest point of the latter, and, during a cycle of the control unit, its end on which the spring fingers 77 are mounted swings first anti-clockwise and then clockwise about the pivot 69. At some point during its anti-clockwise swing, depending on the position of the pick-up arm, the pips engage in the grooves 67, and motion is transmitted to the plate 62 to swing the pick-up arm outwardly to a maximum outward position, and then to swing the said pick-up arm inwardly to a position for commencing to play the next record, that position being determined by setting a movable stop 79 to be engaged by one or other of the steps 64, 65, 66, on the plate 62.

The position of the stop 79 is controlled by a sizing mechanism which forms no part of the present invention and will not be described herein.

The driving pin 61 of the control unit 58, during the rotation of the control unit, engages and displaces an arm 148, urged towards the said driving pin 61 by a tension spring 149, to move to-and-fro a pecker member 150 co-operating with a rocking member 151 pivoted at 152 on the base-plate 20, the rocking member 151 being formed with two notches 153 and 153*a* one on each side of a V-shaped nose 154, the centre line of which passes through the pivot axis of the said rocking member 151, the said rocking member being acted on by a spring 155 which, once the said rocking member has passed a dead-centre position, tends to urge it towards either one of two movement limiting stops 156 and 157, depending on its direction of motion.

The pecker member 150, as shown in FIGURES 3 and 4, is biassed to a central position by a tension spring 221 extending between anchorage points on the said pecker member 150 and on the arm 148 respectively, the said central position of the pecker member being such that its tip travels along a path passing through or very close to the pivot axis of the rocking member 151.

Depending on the position of the rocking member 151 when the pecker member 150 is operated, the said pecker member is guided by the nose 154 into one or other of the notches 153 and 153*a*, and moves the rocking member over its dead-centre position so that it moves to its other extreme position. Thus the rocking member 151 is moved in opposite directions by successive cycles of the control unit 58, this movement being used to determine whether the pick-up is lifted to play a record above it or lowered to play a record on the turntable, whether or not a releasing mechanism is operated to cause a record to drop on to the turntable, and in which direction the turntable is rotated for the next playing operation.

The sizing mechanism includes an arm which moves outwardly across the under surface of the lowermost record in the stack during a control cycle and, if there is no record present, causes the closing of contacts to energise a solenoid coil 165.

The solenoid coil 165 co-operates with an armature 166 (FIGURE 3) coupled by a link 167 to one corner of a triangular plate 168 pivoted at another corner thereof to the base-plate 20, another link 169, pivoted to the triangular plate 168 co-axially with the link 167, acting through a tension spring 171 on a pivoted latch 172 adapted to engage with a turned-up ear 173 on the plate 62 to hold the pick-up arm in a position clear of the records. To the third corner of the triangular plate 168 is connected one end of a further rod 174.

A spring 177 acting on the armature 166 urges it in a direction to release the latch 172, and the solenoid coil 165, when energised, urges it in the opposite direction. A latch 178, pivoted at 179 on the base-plate 20, is urged by a tension spring 181 about its pivot to engage a collar 182 on the armature 166 and retain the latter in the position to which it is moved when the solenoid coil, 165 is energised, the collar 182 having a frusto-conical face co-operating with the latch 178 to move it out of the way as the armature moves under the influence of the solenoid coil. The latch 178 also carries a pin 183 adapted to be engaged by a nose 184 on a supporting arm 81 for the stop 79 to release the said latch 178 the arm 81 being moved to release the latch 178 by a striker 211 carried on the portion 72 of the compound arm 68, as the said arm 68 returns to its normal position.

The upward and downward movement of the pick-up arm 28 to bring the pick-up into position for playing records above or on the turntable respectively is effected by a lever 212, pivoted at 213 on a bracket 214 fixed to the base-plate 20, the lever 212 acting at one end on the pick-up arm 28 through a rod 215 extending through the tubular spindle 34, and being moved up or down at its other end by a double ramp member 216 pivoted to it and moved to bring an upward ramp 219*a* or a downward ramp 219 thereon into alignment with a follower pin 217 carried by the portion 72 of the arm 68. The ramps 219*a* and 219 are formed at the end of the ramp member 216 remote from its pivotal connection to the lever 212, the remainder of the said unit providing a flat surface 221 from which the ramps diverge upwardly and downwardly. The ramp member 216 is connected by a link 218 to the rocking member 151, so that it is moved from one position to the other by the said rocking member.

Associated with the pecker member 150 is a bar 158 movable by means of a control knob 159 on the upper side of the turntable from the position shown in FIGURE 3, in which it is clear of the pecker member, to a position in which it deflects the said pecker member towards the left, thus causing it, on each cycle of the control unit 58, to move into the notch 153 on the rocking member, so the position of the rocking member is not changed, and the machine remains set for playing the upper sides of records on the turntable.

The rotary control unit 58, as shown in FIGURE 3, normally occupies a position such that the gap in the teeth of the interrupted gear 57 is opposite the worm 56, so that the latter is free to rotate without driving the interrupted gear. An arm 186, pivoted on the driving pin 61, is formed with a projection 187 adapted to engage with the thread of the worm 56 so as to cause the latter to be moved far enough to engage its teeth with the said thread, the arm 186 being pivoted coaxially with another arm 188, with which it has a lost-motion connection. The arm 188 is operated by a push rod 189 when the pick-up reaches the inner end of the sound track on a record, the push rod 189 being moved by an ear 189*a* on the plate 62 already mentioned, to engage the projection 187 with the worm, and is moved to its inoperative position as the control unit approaches the end of a revolution by a shoulder 191 on the arm 188 engaging the worm. The arm 188 is similarly operable to start a control cycle by the actuation of a "start" control 192.

A three-armed lever 193 pivoted at 194 on the base-plate 20 has one arm thereof connected by a link 195 to an on-off switch 196 in the circuit of the electric motor 25, and is urged by a tension spring 197 extending between that arm and an anchorage point on the base-plate 20 in a direction to close the switch. Another arm of the lever 193 is linked to a lever 198 arranged to move the friction wheels 51, 52 towards and away from the turntable rim, and the third arm carries a trigger member 199, pivoted to the said arm. The rod 174 passes through a boss 201 on the trigger member 199, and a coiled compression spring 202, fixed at one end to the rod 174, acts on the said boss, applying, when the plate 168 is rotated by the solenoid 165, a thrust tending to rotate the trigger member 199, clockwise as shown in FIGURE 3, about its pivot. Another rod 203, passing through another boss 204 on the trigger member 199, carries a pair of spaced collars 205 and 206 one on each side of the boss 204, a coiled compression spring 207 between the boss 204 and the collar 206 tending to urge the collar 205 against the boss 204. The other end of the rod 203 carries a spool 208 movable to-and-fro between two spring fingers 209, 209*a* fixed to the base-plate 20, so as to maintain the said spool in either one of two positions.

The trigger member 199 co-operates with the portion 72 of the arm 68, a down-turned end thereof being urged against the side of the said arm portion 72 when the solenoid coil 165 is energised and moving, during the initial part of the succeeding oscillation of the arm 68, into a position substantially perpendicular thereto, so that on the return movement of the said arm 68 the three-armed lever is rocked to open the switch 196, this movement of the trigger member 199 also moving the spool 208 through the spring fingers 209, 209*a*.

When the machine is not operating the control unit 58 is stationary, the worm 56 being opposite the gap in the teeth of the gear wheel 57. The arm 68, by reason of the fact that its cam follower 75 is in engagement with the highest point of the cam 59, is swung to the left-hand extreme of its arc of movement, and the rocking member 151 is in such a position that the pin 217 is opposite the downward ramp of the ramp member 216.

The pick-up arm 28 is supported by a rest 220, so that the pin 217 is not in engagement with the ramp 219, and the said arm is held against inward movement by the latch 172.

The releasing mechanism for the records on the spindle comprises a finger movable in a slot in the spindle to displace the lowermost record from the shoulder 39, the finger being operated by downward movement of a stem 222 slidable in the spindle 35 by means of a rocker member 223 pivoted on a bracket 224 fixed to the base-plate 20 and moved to effect the release of a record by a link 225 pivoted to a lever 226 itself pivoted on the base-plate 20. The lever 226 is rocked by being operated by another lever 227 pivoted on the base-plate and caused to make an oscillating movement during each cycle of movement of the control unit 58 by the driving pin 61. The lever 226 carries a bell-cranked lever 228, pivoted to it at 229, one arm of the bell-crank lever 228 being pivotally connected at 231 to a link 232 by which it is coupled to the rocking member 151.

In the position of the rocking member for playing recordings on the upper sides of records, as it is shown in FIGURE 3, the link 232 holds the bell-crank lever 228 in such a position that its other arm lies in the path of the lever 227, so that movement of that lever also moves the lever 226 and causes a record-dropping operation to be effected, but when the rocking member is in the position for playing the underside of a record, as shown in FIGURE 4, the bell-crank lever 228 is displaced out of the path of the lever 227, and the latter lever moves idly, without moving the lever 226.

The friction wheels 51 and 52 are carried by articulated arms 233 which are rocked simultaneously about their common pivot at 234 to bring one or other of them into engagement with the rim 27 on the turntable by angular movement of a plate 235 having pins 236 co-operating with the said arms. The plate 235 has a projecting arm 237 coupled by a link 238 to the rocking member 151, so that the movement of the said rocking member is transmitted to the plate. In the position of the rocking member 151 corresponding to topside playing, as shown in FIGURE 3, the friction wheel 51 is in a position to engage the turntable rim, and in the position of the rocking member 151 corresponding to underside playing, shown in FIGURE 4, the friction wheel 52 engages the turntable rim.

The operation of the machine, in so far as it concerns the present invention, is as follows. When the machine is idle, the parts are in the positions shown in FIGURE 3. The machine is started by moving the spool 208, by means of a suitable manual control, in the direction of the arrow S in FIGURE 3, so that it passes between the spring fingers 209, 209*a* and is held by them in its new position. This movement is transmitted through the trigger member 199 to the three-armed lever 193, which moves to close the switch 196 and to move the friction wheels 51, 52 towards the turntable rim, the wheel 51 engaging the latter due to the position of the plate 235. The manual control also moves the slide bar to bring the projection 187 on the arm 186 into engagement with the worm 56, so that both the turntable 21 and the control unit 58 start to rotate. The cam 59 moves the compound arm 68 so that its end carrying the fingers 77 move in an anti-clockwise direction, the pick-up arm 28 being lifted off the rest 220 due to the movement of the pin 217 on to the surface 221 of the ramp member 216, and the pips 78 engage the grooves 67 in the plate 62 shortly before the arm 68 reaches the end of its swing in this direction, moving the said arm outwardly and causing the latch 172 to disengage the plate 62. At about the position where outward movement of the pick-up arm ceases, the driving pin 61 engages the arm 148 to commence the operative stroke of the pecker member 150, and when the said pecker member has moved far enough to change the position of the rocking member 151 the driving pin 61 engages the lever 227 and rocks it about its pivot. The cam 59 has a dwell portion which is traversed by the follower 75 whilst the above-mentioned operations are taking place.

Since the rocking member was moved to the position for underside play before the lever 227 was moved, the said lever moves idly and does not operate the record dropping mechanism. The link 218 is, however, operated to move the ramp unit 216 and bring the upwardly inclined ramp 219*a* into the path of the pin 217, and the plate 235 is moved to bring the friction wheel 52 into engagement with the turntable rim, so that the latter is driven through the idler wheel 53, and its direction of rotation is reversed.

The continued rotation of the control unit 58 causes the compound arm 68 to swing in the opposite direction, causing the pick-up arm to swing inwardly until one of the steps 64, 65, 66 on the plate 62 engages the movable stop 79, depending on the setting of the latter by the sizing mechanism, the pips 78 being pulled out of the grooves 67 by continued movement of the compound arm 68, leaving the pick-up arm free. The compound arm 68 then returns to its initial position, where it is beyond the position reached by the steps 64, 65, 66 at the end of the inward swing of the pick-up arm. During the last part of this return movement of the arm 68, the upwardly inclined ramp 219a on the ramp member 216 comes into engagement with the pin 217, and the pick-up is raised into engagement with the under-surface of the lowermost of the records resting on the shoulder 39 of the spindle 35.

The recording on the underside of that record is played, and, when the pick-up stylus reaches the inner part of the record groove, the arm 186 is again rocked, by the movement of the push rod 189, to bring the projection 187 thereon into engagement with the thread of the worm 56. The control unit therefore makes another cycle as described above, this time moving the rocking member 151 to the topside play position, so that the ramp member 216 is moved to bring the downward ramp 219 into the path of the pin 217, the bell-crank lever 228 is moved into the path of the lever 227, and the plate 235 is moved to bring the friction wheel 51 into engagement with the turntable rim. The record releasing mechanism is therefore operated to release a record, and the pick-up, during the final movement of the arm 68, is lowered on to the surface of the record dropped on to the turntable.

Following cycles of movement of the control unit set the machine for alternate playing of undersides and top sides of records until, when the last record has dropped, the absence of a record on the spindle 35 is sensed by a sizing arm, and, as a result, the solenoid 165 is energised to rock the trigger member 199, after the arm 68 has made the first half of its oscillatory movement, to a position substantially at right angles to the said arm 68. The solenoid also sets the latch 172 to engage the ear 173 on the plate 62. When the arm 68 starts to return, the ear 173 engages the latch 172, stopping the inward movement of the pick-up arm when the latter is above the rest, the arm 68 continuing its movement and acting, through the trigger member 199, on the three-armed lever 193 to rock the latter so as to open the switch 196 and pull the friction wheels 51 and 52 away from the rim of the turntable. The rocking of the trigger member 199 also moves the rod 203 to displace the spool 208 to its other position, ready for actuation to re-start the machine.

By moving the bar 158 towards the left in FIGURE 3 so that it pushes the pecker member 150 somewhat to the left, the latter is caused, on every cycle of the control unit, to move into the notch 153 on the rocking member 151, with the result that that member remains in the position shown in FIGURE 3. The turntable is therefore driven continuously in the direction for playing the top sides of record, the ramp unit 216 remains in such a position that the pick-up is lowered at the end of each control cycle, and a record is dropped during each control cycle.

Thus only the recordings on the top sides of the records are played, the machine being stopped after playing the last record in the manner above described.

I claim:

1. In a sound reproducing machine having a turntable, adapted to support a stack of records, having a top side and an under side, and a pick-up arm adapted to play both said top and said under side of said records; a control member, a first means determining a control cycle of said machine and controlling the direction of rotation of said turntable, a second means for effectuating the movements of said pick-up arm for bringing said pick-up arm into playing relation with said top side and said under side, respectively, of one of said records above or below said pick-up arm, a third means for releasing one of said records from said stack onto said turntable, linkage means connecting said first, second and third means, a rocking member arranged in said linkage means, said rocking member being movable between two predetermined positions, said linkage means being arranged for moving said rocking member from one of said predetermined positions to said other predetermined position during each one of said control cycles of said machine, a pecker member arranged within said linkage, said pecker member being moved during each one of said control cycles, and said rocking member having faces being engaged by said pecker member in such manner that when said rocking member is in either one of its predetermined positions, it will be moved to its other predetermined position by the movement of said pecker member, a pivoted arm, said pecker being pivotally mounted on said arm, and a striker means on said control member, said striker means being arranged for moving said pivoted arm during each one of said control cycles.

2. A sound reproducing machine, according to claim 1, having a compound arm, and a cam attached to said control member, said cam acting on said compound arm for effecting an outward and an inward movement of said pick-up arm.

3. A sound reproducing machine, according to claim 1, said rocking member having two notches and having a V-shaped nose separating said notches, the center line of said V-shaped nose passing through the pivotal point of said rocking member, said movement of said pecker member being such that it passes to one side of said nose when said rocking member is in one position and to the other side of said nose when said rocking member is in its other position.

4. A sound reproducing machine, according to claim 3, said pivotally mounted pecker member comprising resilient means biasing said pecker member to a predetermined position relative to said pivoted arm, and means for displacing said pecker member about its pivot to a position such that when operated, said pecker member passes to the same side of said nose of said rocking member regardless of the position of the latter.

References Cited by the Examiner

UNITED STATES PATENTS

| | | | |
|---|---|---|---|
| 2,622,884 | 12/52 | Carson | 274—10 |
| 2,628,843 | 2/53 | Comstock | 274—10 |

FOREIGN PATENTS

| | | |
|---|---|---|
| 645,386 | 11/50 | Great Britain. |

NORTON ANSHER, *Primary Examiner.*

NEWTON N. LOVEWELL, ALDRICH F. MEDBERY, *Examiners.*